United States Patent
Hansen et al.

(10) Patent No.: US 7,861,993 B2
(45) Date of Patent: Jan. 4, 2011

(54) HEATED/COOLED CUP HOLDER AND SEALING UNIT

(75) Inventors: Alison Hansen, Flint, MI (US); Christopher R Reynolds, Oxford, MI (US); Mark A Kelly, Shelby Township, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1007 days.

(21) Appl. No.: 11/539,701

(22) Filed: Oct. 9, 2006

(65) Prior Publication Data

US 2007/0090256 A1    Apr. 26, 2007

Related U.S. Application Data

(60) Provisional application No. 60/725,556, filed on Oct. 11, 2005.

(51) Int. Cl.
*A47K 1/08* (2006.01)
(52) U.S. Cl. .............. 248/311.2; 248/314; 62/3.64
(58) Field of Classification Search .............. 248/309.1, 248/311.2, 314; 296/24.34, 37.8, 37.12; 220/737, 739, 592.16, 592.17, 715, 501, 220/23.87, 703, 662
See application file for complete search history.

(56) References Cited

U.S. PATENT DOCUMENTS

| | | | |
|---|---|---|---|
| 5,297,767 A | 3/1994 | Miller et al. | |
| 5,509,633 A | 4/1996 | Ruster et al. | |
| 5,697,587 A | 12/1997 | Israel | |
| 5,704,579 A | 1/1998 | Celentino et al. | |
| 6,082,114 A * | 7/2000 | Leonoff | 62/3.64 |
| 6,398,061 B2 * | 6/2002 | Duff et al. | 220/592.16 |
| 6,422,300 B1 | 7/2002 | Wylin | |
| 6,516,967 B2 * | 2/2003 | Duff et al. | 220/592.16 |
| 6,708,938 B2 * | 3/2004 | Bong | 248/311.2 |
| 7,413,154 B2 * | 8/2008 | Harshman et al. | 248/311.2 |

* cited by examiner

*Primary Examiner*—Gwendolyn Baxter
(74) *Attorney, Agent, or Firm*—Ralph E. Smith

(57) ABSTRACT

A cup holder, wherein the cup holder comprises a well adapted to receive a beverage container through an open top of the well. The cup holder also includes a sealing unit having a ring seal secured to the well adjacent to the open top of the well. The ring seal engages the container when the container is disposed in the well to cooperate with the well in providing a substantially closed and sealed chamber resistant to heat transfer to or from the chamber.

12 Claims, 2 Drawing Sheets

HEATED/COOLED CUP HOLDER AND SEALING UNIT

CROSS REFERENCE TO RELATED APPLICATION(S)

This application is a continuation of U.S. Pat. application Ser. No. 60/725,556 filed Oct. 11, 2005.

FIELD OF THE INVENTION

The present invention relates generally to cup holders and more particularly to a sealing unit for a cup holder in an automotive vehicle.

BACKGROUND OF THE INVENTION

Cup holders have a variety of different uses. A cup holder is particularly useful in an automotive vehicle where it can hold a beverage container close to the driver or to passengers in the vehicle. However, all too soon, hot beverages become cold and cold beverages become warm. Preferably the beverage should hold its temperature as long as possible.

SUMMARY OF THE INVENTION

In accordance with the present invention, a cup holder is shown comprising a well adapted to receive a beverage container through an open top of the well. A sealing unit is secured to the well. The sealing unit comprises a ring seal that engages the container. The ring seal cooperates with the well in providing a substantially closed and sealed chamber surrounding a major lower portion of the container which is resistant to heat transfer to or from the chamber.

More specifically, the well of the cup holder has an annular side wall and a bottom wall. The ring seal has a radially outer supporting ring section that is secured to the side wall of the cup holder adjacent to the open top of the well. The ring seal has a radially inner ring section that sealingly engages the beverage container.

Preferably the radially inner ring section is relatively soft, flexible and compressible. Also, the radially inner ring section is preferably made of one piece and includes a circular series of circumferentially contiguous segments joined only at the radial outer edge with little or no separation between the segments.

The radially outer supporting ring section may be secured to the side wall of the cup holder by an adhesive or by clips engaged in slots in the side wall or by other means.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and accompanying drawings, wherein.

DETAILED DESCRIPTION OF THE PREFERRED EMBODIMENT

Figure 1:
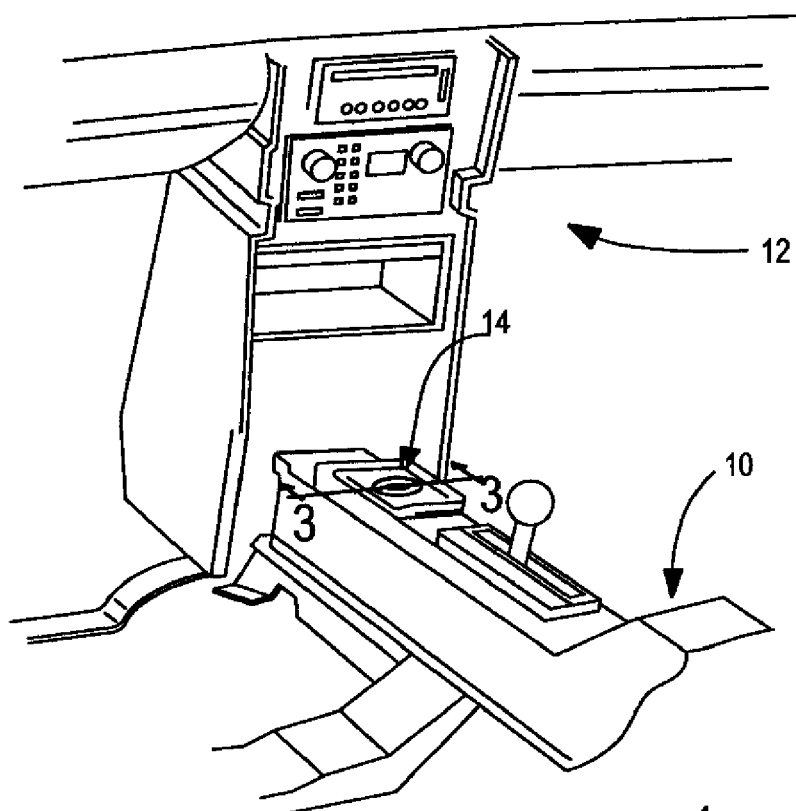
FIG. 1 is a fragmentary perspective view of the inside of a typical automotive vehicle showing a center console having a cup holder constructed in accordance with the present invention.

The following description of the preferred embodiment is merely exemplary in nature and is in no way intended to limit the invention, its application, or uses.

Referring now more particularly to the drawing, there is shown a center console 10 in a front area of an automotive vehicle 12 next to the driver's seat. The console 10 has a cup holder 14 comprising a well 16 for receiving a beverage container 18 which typically has a cylindrical side wall 20.

Figure 3:
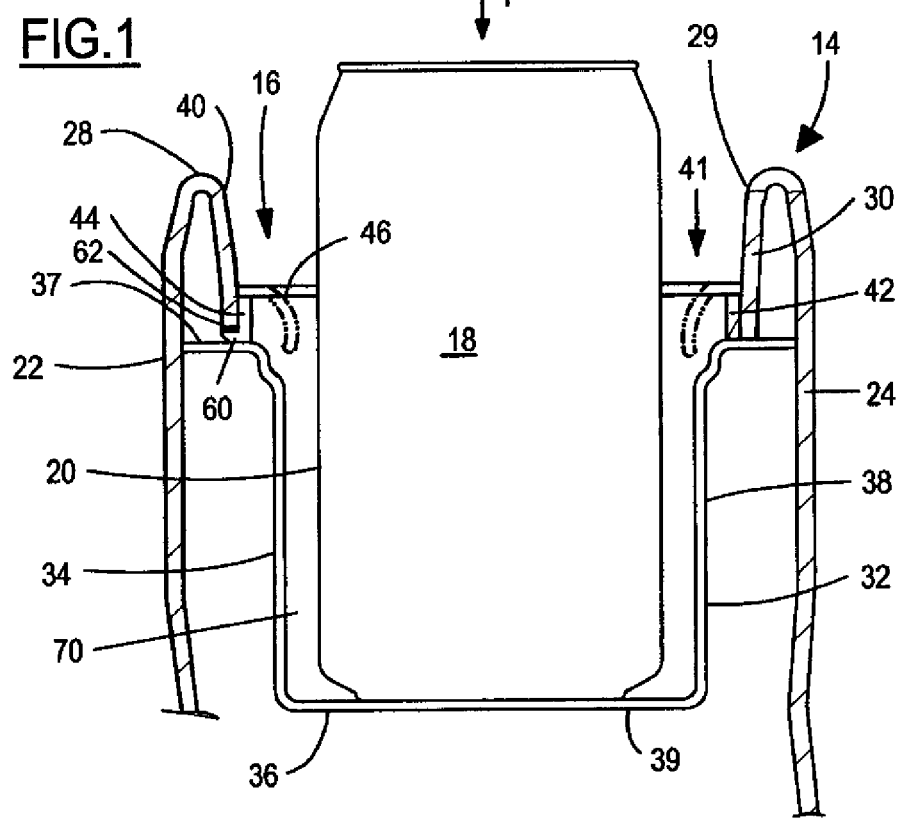
FIG. 3 is a sectional view taken on the line 3-3 in FIG. 1, and also showing the sealing unit surrounding a beverage container disposed within the cup holder.

The console 10 has laterally spaced apart, generally vertical outer side walls 22 and 24 and generally vertical outer front and rear walls 26 and 27, and a horizontal top wall 28. As seen in FIG. 3, the top wall 28 of the console has a center opening 29. An annular flange 30 extends downwardly into the console from the center opening 29. The annular flange 30 is generally vertical, although slightly downwardly tapering.

Secured within the console beneath the annular flange 30 is an open top receptacle 32 which has a vertical annular side 34 and a generally horizontal bottom 36. The lower edge of the flange 30 rests on an annular rim 37 at the top of the receptacle 32 in a sealed contact with the rim. The annular side 34 of the receptacle 32 is generally concentric with the annular flange 30 of the console 10 so that the annular flange 30 and the annular side 34 together form the side wall 38 of the well 16. The bottom 36 of the receptacle 32 forms the bottom wall 39 of the well 16. The opening 29 in the top wall 28 of the console forms the open top 40 of the well.

Figure 2:
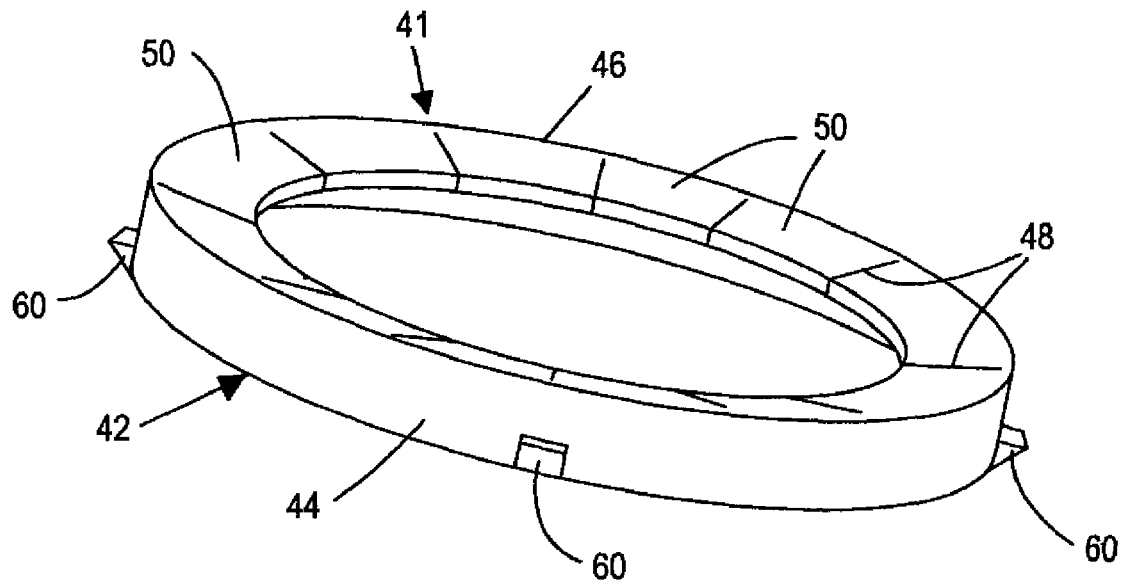
FIG. 2 is a perspective view of a sealing unit for use with the cup holder, also constructed in accordance with the invention.
Figure 4:
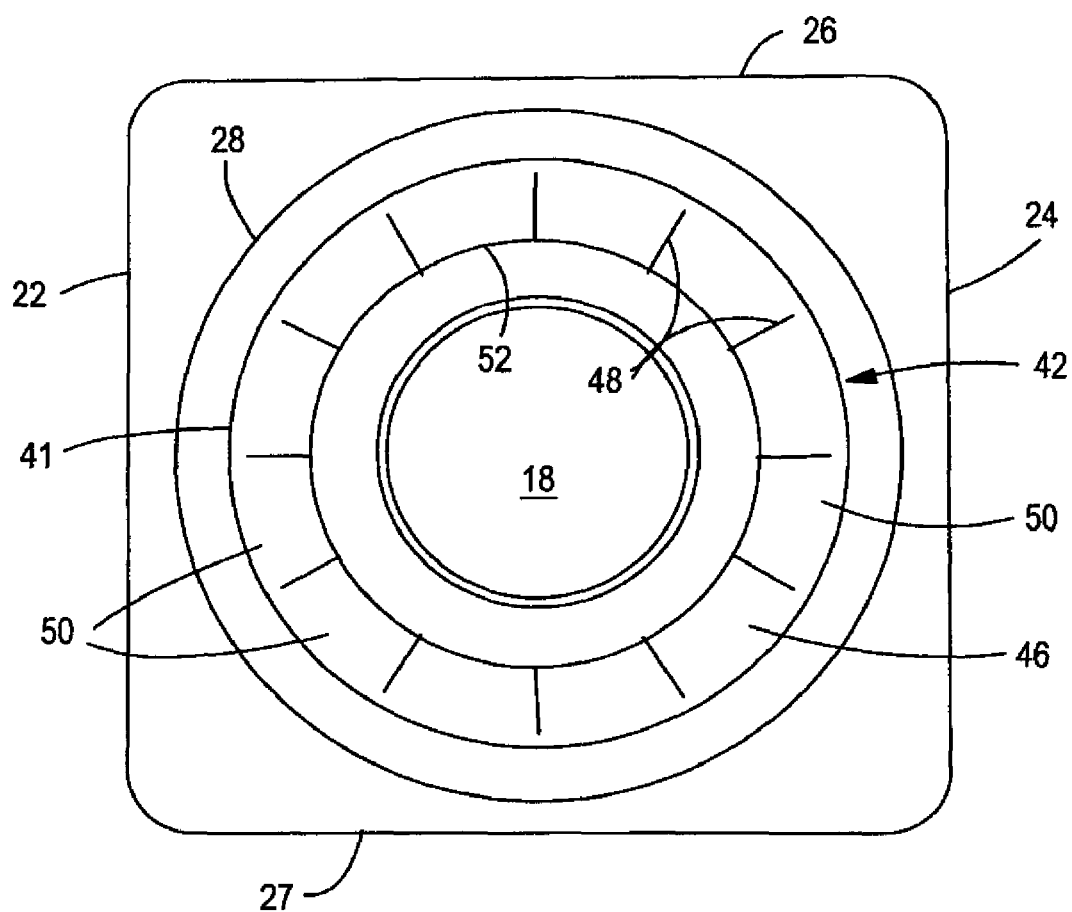
FIG. 4 is a view looking in the direction of the arrow 4 in FIG. 3.

A sealing unit 41 is provided for the cup holder 14. The sealing unit 41, as best seen in FIG. 2, comprises a ring seal 42 which when inserted in the well 16, is concentric with the side wall 38 of the well. The sealing unit 41 has a circular radially outer supporting ring section 44 and a circular radially inner ring section 46 secured and sealed to the supporting ring section as by a suitable adhesive or other fastening means. The outer supporting ring section 44 is preferably in the form of a tubular band and is made of a relatively strong self-supporting material, such, for example, as polyethylene or any other suitable plastic.

The inner ring section 46 is preferably in the form of a one piece layer of a relatively soft, compressible and flexible material such as natural or synthetic rubber. The inner ring section 46 is radially cut at circumferentially equally spaced points indicated at 48 to separate the radially outer portion of the inner ring section into circumferentially contiguous segments 50, with minimum width that is, little or no clearance, separating the segments.

The radially inner surfaces or edges 52 of the segments 50 of the inner ring section 46 are arcuate and together form a continuous or, nearly continuous, closed circle. The diameter of the circle defined by the inner edges 52 of the segments 50 of the inner ring section is preferably somewhat smaller than the diameter of the smallest beverage container that is likely to be held in the cup holder.

The ring seal 42 is disposed horizontally in the well 16 adjacent to the open top 40 of the well, with the outer supporting ring section 44 extending vertically and pressing against the flange 30 of the side wall 38 of the well. The inner ring section 46 extends horizontally, radially inwardly from the outer supporting ring section 44. The outer supporting ring section 44 may be secured to the side wall 38 of the well by a suitable adhesive or by angularly spaced clips 60 formed integrally with the outer supporting ring section 44 which extend into small slots 62 formed in the flange 30. The tops of the clips are preferably horizontal to better lock into the slots, while the bottoms of the clips are preferably slanted radially outwardly and upwardly to facilitate the insertion of the seal ring 42 through the open top of the well 16 and into the flange 30. The outer supporting ring section 44 presses against the flange 30 of the side wall 38 of the well in sealed contact therewith throughout the full circumference of the supporting ring section.

In use, and with the sealing unit 41 in position in the well as shown in FIG. 3, the beverage container 18 may be placed in the well through the open top 40 thereof to a position in which it is seated on the bottom wall 39 and the radially inner surfaces 52 of the segments 50 of the inner ring section 46 are in sealing contact with the side wall 20 of the beverage container. The well 16 can accommodate beverage containers of a larger diameter than the beverage container 18, in which case the segments 50 of the inner ring section 46 will fold or bend downwardly as shown in dotted lines in FIG. 3, with the segments 50 still in sealing contact with the container. The inner ring section segments 50 form a near continuous seal around substantially a full 360° of circumference of the beverage container. The bottom wall 39 is imperforate and the side wall 38, except for the small slots 62 in the flange 30, is also imperforate so that the ring seal 42 cooperates with a lower portion of the side wall 38 and with the bottom wall 39 in providing a substantially closed and sealed chamber 70 surrounding a major lower portion of the beverage container 18 which is resistant to the transfer of heat to or from the chamber. The slots 62 are small and allow only a very slight heat transfer. If, instead of the clip and slot connection shown, the outer supporting ring section 44 of the ring seal 42 is adhesively secured to the side wall 38 of the well in a sealed relationship, there would be virtually no heat transfer from the chamber 70.

A cold beverage in the container will be kept cold for a longer period of time and likewise a hot beverage will retain its heat for a longer period of time due to the substantially closed and sealed chamber 70.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle, wherein said vehicle comprises:
a console, said console having a cup holder;
said cup holder further comprising:
   a well adapted to receive a beverage container through an open top of said well with said well comprised of a radially inwardly extending annular shoulder, a downwardly extending generally annular flange interiorly disposed adjacent said open top, said well comprising a receptacle having a bottom wall and a generally radially extending annular rim defining a portion of said annular shoulder;
   a sealing unit having a ring seal secured to said well adjacent to said open top of said well and in registry with said annular shoulder; and
   said ring seal engaging said container when said container is disposed in said well to cooperate with said well in providing a substantially closed and sealed chamber surrounding a major lower portion of the container which is resistant to heat transfer to or from the chamber.

2. The vehicle of claim 1, wherein said ring seal further comprises:
   a radially outer supporting ring section that is secured to said well adjacent to an open top of said well and arranged to be generally concentric with said side wall of said well and abutting said annular shoulder; and
   a radially inner ring section that engages said beverage container when said beverage container is disposed in said well and arranged to cooperate with a lower portion of said side wall and with said bottom wall of said well in providing said substantially closed and sealed chamber.

3. The vehicle of claim 2, wherein said radially outer supporting ring section sealingly engages said side wall throughout substantially a full 360° of circumference of said outer supporting ring section.

4. The vehicle of claim 2, wherein said radially inner ring section is relatively soft, flexible and compressible.

5. The vehicle of claim 2, wherein said radially inner ring section is made of one piece, and a radially outer portion of said inner ring section comprises a series of circumferentially contiguous segments with substantially zero clearance separating said segments.

6. The vehicle of claim 2, wherein said radially outer supporting ring section is secured to said well by clips on said radially outer supporting ring section engageable in slots in said side wall of said well.

7. The vehicle of claim 1, wherein said ring seal has (a) a radially outer supporting ring section disposed (i) in abutment with said shoulder and (ii) in snap-fit engagement with said annular flange, and (b) a radially inner ring section engaging said beverage container when said beverage container is disposed in said well.

8. The vehicle of claim 7, further comprising a plurality of clips that provide snap-fit engagement between said radially outer supporting ring section and said annular flange.

9. The vehicle of claim 8, wherein said plurality of clips extend from said radially outer supporting ring section and are received in a corresponding slot formed in said annular flange.

10. The vehicle of claim 9, wherein said annular flange has an axial edge and wherein a portion of said radially extending annular rim of said receptacle abuts against said axial edge of said annular flange.

11. A cup holder in a vehicle, wherein said cup holder comprises:
   a well having an annular side wall and a bottom wall and comprising a radially inwardly extending shoulder, said well adapted to receive a beverage container through an open top of said well, and said side wall having an interiorly disposed downwardly extending generally annular flange adjacent said open top, said well comprising a receptacle having a bottom wall and generally radially extending annular rim defining a portion of said shoulder; and
   a ring seal having (a) a radially outer supporting ring section disposed (i) in registry with said shoulder and (ii) in snap-fit engagement with said well, and (b) a radially inner ring section engaging said beverage container when said beverage container is disposed in said well defining a thermally insulating chamber between a portion of the container and said well below said ring seal.

12. The vehicle of claim 11, further comprising a plurality of clips that provide snap-fit engagement between said radially outer supporting ring section and said annular flange.

* * * * *